US012808143B1

(12) United States Patent
Patil et al.

(10) Patent No.: US 12,808,143 B1
(45) Date of Patent: Nov. 24, 2026

(54) SYSTEM AND METHOD FOR CONTROLLING STRAIGHT-LINE DYNAMIC MOTION OF IMPLEMENT OF SELF-PROPELLED VEHICLE

(71) Applicant: Deere & Company, Moline, IL (US)

(72) Inventors: Vikas M. Patil, Pune (IN); Surya Pratap Ponnana, Pune (IN); Justin Sticksel, Platteville, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 19/264,938

(22) Filed: Jul. 10, 2025

(51) Int. Cl.

| | |
|---|---|
| ***E02F 3/43*** | (2006.01) |
| ***B66C 13/48*** | (2006.01) |
| ***E01H 1/02*** | (2006.01) |
| ***E02F 3/96*** | (2006.01) |
| ***E02F 5/30*** | (2006.01) |

(52) U.S. Cl.
CPC .............. *E02F 3/437* (2013.01); *B66C 13/48* (2013.01); *E01H 1/02* (2013.01); *E02F 3/963* (2013.01); *E02F 5/305* (2013.01)

(58) Field of Classification Search
CPC ........... E02F 3/437; E02F 3/963; E02F 5/305; B66C 13/48; E01H 1/02
See application file for complete search history.

(56) References Cited

U.S. PATENT DOCUMENTS

| | | | | |
|---|---|---|---|---|
| 6,076,029 | A * | 6/2000 | Watanabe | E02F 3/437 37/340 |
| 11,873,621 | B2 | 1/2024 | Kean | |
| 12,006,663 | B2 | 6/2024 | Kean | |
| 2019/0160667 | A1 | 5/2019 | Henikl et al. | |
| 2019/0226181 | A1* | 7/2019 | Imura | E02F 9/2221 |
| 2025/0002302 | A1 | 1/2025 | Gnagey et al. | |
| 2025/0012052 | A1* | 1/2025 | Tsukamoto | E02F 9/2235 |
| 2025/0163670 | A1* | 5/2025 | Sai | E02F 3/32 |
| 2025/0333926 | A1* | 10/2025 | Miyoshi | E02F 3/437 |

* cited by examiner

*Primary Examiner* — Stephanie T Su
(74) *Attorney, Agent, or Firm* — Jerry Turner Sewell; Lucian Wayne Beavers; Patterson Intellectual Property Law, PC

(57) ABSTRACT

A system and method control the angular movements of the components a work implement to automatically move an object attached to the work implement along a linear trajectory between an initial location and a target location. The system and method issue initial hydraulic flow commands to cause an initial movement of the object. The system and method compare a measured position of the object with an expected position of the object and respond to differences in the measured position and the expected position to modify the hydraulic flow commands as needed to return the object to the linear trajectory.

19 Claims, 8 Drawing Sheets

SYSTEM AND METHOD FOR CONTROLLING STRAIGHT-LINE DYNAMIC MOTION OF IMPLEMENT OF SELF-PROPELLED VEHICLE

FIELD OF THE DISCLOSURE

The present disclosure relates generally to self-propelled work vehicles such as construction and forestry machines having a boom, an arm, and an attachment, and more particularly to systems and methods for controlling the movement of the attachment to achieve a linear trajectory of the attachment or an object attached to the attachment.

BACKGROUND

Self-propelled work vehicles of the type disclosed herein may for example include excavators, backhoes, forestry machines, and others having a work implement. Such work vehicles can typically have tracked ground engaging units supporting the undercarriage from the ground surface. Such work vehicles can further include a work implement, which includes one or more components, that is used to modify the terrain in coordination with movement of the work vehicle. The following discussion refers to the structure and operation of an excavator wherein the work implement comprises a boom, an arm, and an attachment attached to the arm; however, the discussion also applies to other work vehicles having a similar work implement.

An excavator can have an undercarriage that engages the terrain with ground engagement units (e.g., tracks) that are controllable to move the undercarriage forward and backward with respect to the terrain and to turn the undercarriage with respect to the terrain. A main frame is mounted on the undercarriage via a swing bearing and can be rotated (swiveled) with respect to the undercarriage so that the main frame can be positioned in different angular directions with respect to the undercarriage while the undercarriage remains in a fixed location. In isolation, the work machine can be considered to have a machine coordinate system defined by the main components of the machine. For example, the ground engagement units can be considered as defining a horizontal plane in the machine coordinate system, and the main frame can be considered as rotating about a vertical pivot axis normal to the horizontal plane. However, unless the undercarriage of the excavator is resting or moving on level terrain, the machine coordinate system is not coincident with a gravitational coordinate system defined by the gravity of the Earth. For example, if the excavator is positioned on a slope, the pivot axis of the work machine will not be aligned with or parallel to a vertical axis in the gravitational coordinate system. The vertical axis of the gravitational coordinate system is defined herein as being vertical in the direction of the gravitational force vector such that the positive direction of the vertical axis is vertically upward. Unless otherwise specified, as used herein, horizontal, vertical, and normal are referenced to the gravitational coordinate system. Thus, for example, a vertical component of movement is along the vertical axis of the gravitational coordinate system, and a horizontal component of movement is perpendicular (or normal) to the vertical axis of the gravitational coordinate system.

The main frame of the work vehicle (e.g., excavator) is the base for a work implement, which extends from the main frame and is pivotable with respect to the main frame. With respect to an excavator, the work implement can include a boom, an arm, and an attachment. The boom, arm, and attachment are linked together to form the work implement. For example, a first end portion of the boom can pivot about a first implement axis (e.g., a boom axis), which is fixed with respect to the main frame. The boom has a second end portion that rotates angularly about the boom axis. The arm has a first end portion that can pivot about a second implement axis (e.g., an arm axis), which is fixed with respect to the second end portion of the boom. The arm has a second end portion that rotates angularly with respect to the arm axis. The attachment has a first end portion that can pivot about a third implement axis (e.g., an attachment axis), which is fixed with respect to the second end portion of the arm. The attachment has a "point-of-interest," which is the portion of the attachment that interacts with the terrain to modify the terrain. For example, in an exemplary excavator having a bucket as the attachment, the point-of-interest can be the tip of the bucket or the teeth extending from the tip of the bucket. In another example, the attachment can be a blade, and the point-of-interest can be the edge of the blade that moves dirt or other material. In another example, the attachment can be a jackhammer, and the point-of-interest can be the tip of the jackhammer. In another example, the attachment can be a rotary sweeper and the point-of-interest can be the peripheral of the sweeper that engages a surface being swept.

The movements of the boom, the arm, and the attachment about the respective pivot axes are controlled by respective actuators. For example, a first (boom) actuator controls the rotation of the boom with respect to the main frame. A second (arm) actuator controls the rotation of the arm with respect to the boom. A third (attachment) actuator controls the rotation of the attachment with respect to the arm. For example, the actuators can be hydraulic motors or hydraulic piston-cylinder units.

Historically, a skilled equipment operator positioned in a cab or other location in or on the frame manipulated control devices (e.g., levers) that selectively activated the actuators to cause the boom, the arm, and the attachment to be positioned such that the point-of-interest of the attachment is positioned in a desired location with respect to the terrain to be modified. The operator then manipulated the control devices further to cause one or more of the boom, the arm, and the attachment to rotate about the respective pivot axes to cause the point-of-interest to modify the terrain proximate to the point-of-interest. For example, for the example of a bucket as the attachment, the boom and the arm can be caused to move the attachment closer to the main frame as the tip (point-of-interest) of the bucket digs into the terrain to remove dirt or other material from the terrain. As the bucket moves closer to the main frame, the bucket can also be rotated to control the depth of the tip of the bucket into the terrain. As described, the foregoing basic operation relies on the visual acuity and skill of the operator to control the positioning of tip of the bucket to create a desired modification to the terrain.

Recognizing the difficulty of manually monitoring and controlling the three-dimensional movement of the point-of-interest of the attachment of an excavator or other work vehicle, equipment manufacturers have automated the control of work vehicles. The work vehicles include control systems that monitor the angular positions of the components (e.g., the boom, the arm, and the attachment) with respect to the main frame and also monitor the positions of the undercarriage and the main frame with respect to the terrain to determine the location of the point-of-interest of the attachment with respect to a target location on the terrain. The control systems further include control algorithms that generate commands to the actuators of the boom, the arm, and the attachment to position the point-of-interest of the attachment accurately and to move the point-of-interest with precision to achieve a desired trajectory for the point-of-interest. For example, the point-of-interest can be controlled to accurately cut a surface to create a uniform grade between two locations on the terrain.

In addition to accurate information regarding the position and orientation of the undercarriage with respect to the target terrain, the functions of the control algorithms depend on accurate determinations of the relative positions of the boom, the arm, and the attachment with respect to each other and with respect to the main frame. U.S. Pat. No. 11,873,621 to Kean for "System and Method for Tracking Motion of Linkages for Self-Propelled Work Vehicles in Independent Coordinate Frames" discloses a system and method using inertial measurement units (IMUs) positioned at selected locations on the main frame, the boom, the arm, and the attachment to accurately determine the location and orientation of an attachment of an excavator or other work vehicle. U.S. Pat. No. 12,006,663 to Kean for "Calibrating Mounting Misalignments of Sensors on an Implement of a Work Machine Using Swing Motion" discloses a system and method for calibrating sensors on a work machine. U.S. Pat. Nos. 11,873,621 and 12,006,663 are incorporated herein by reference.

The systems and methods disclosed in U.S. Pat. Nos. 11,873,621 and 12,006,663 are effective to accurately determine the position of a point-of-interest of a conventional attachment that is pivotably connected to the arm such that the point-of-interest pivots around the attachment axis as described above. However, the movements of a conventional attachment are controlled by a skilled operator who manipulates controls to control the various actuators that move the boom, the arm, and the attachment. Manual manipulation of the actuators is generally sufficient for most cutting and dumping operations; however, an excavator can be used for other operations such as moving objects, sweeping an area, moving a ground-penetrating scanner over a surface, and the like. Such operations need the point-of-interest to travel in a substantially straight line. Although an operator may be highly skilled, movement of the point-of-interest in a substantially straight line is difficult to achieve because such movement requires the continual simultaneous manipulation of the angular positions of the boom, the arm, and the attachment about the respective pivot axes. Instead of moving in a straight line, the point-of-interest will move in a series of jerky movements about a desired trajectory. Thus, for example, if the point-of-interest is a sweeper, the tips of the bristles of the sweeper might have intermittent contact with the surface being swept. As another example, if an object is being lifted out of confined space, the jerky movements about the vertical trajectory of the object can cause the object to have intermittent contact with the boundaries of the confined space. In any case, the continual adjustments by the operator to achieve even a close approximation to linear movement require significantly more effort, which can cause the operator fatigue and resulting errors.

SUMMARY

In view of the foregoing, a need exists for a system and method to achieve linear movement of a point-of-interest automatically to reduce the amount of skill needed by an operator to achieve the linear movement. The current disclosure describes a modification to a self-propelled work vehicle to include minimal additional features to the work vehicle and the control system within the work vehicle to achieve the linear movement.

One aspect of the embodiments disclosed herein is a system and method to control the angular movements of the components a work implement to automatically move an object attached to the work implement along a linear trajectory between an initial location and a target location. The system and method issue initial hydraulic flow commands to cause an initial movement of the object. The system and method compare a measured position of the object with an expected position of the object and respond to differences in the measured position and the expected position to modify the hydraulic flow commands as needed to return the object to the linear trajectory.

Another aspect of the embodiments disclosed herein is a method of controlling the motion of a boom, an arm, and an attachment of a work machine to achieve linear motion of a point-of-interest (POI) of the attachment. The boom is pivotally attached to the work machine at a first pivot location. The arm pivotally is attached to the boom at a second pivot location. The attachment is pivotally attached to the arm at a third pivot location. The boom pivots about the first pivot location with a boom angular velocity in response to an action of at least one boom actuator (two actuators in the illustrated embodiment). The arm pivots about the second pivot location with an arm angular velocity in response to an action of at least one arm actuator. The attachment pivots around the third pivot location with an attachment angular velocity in response to an action of at least one attachment actuator. The method establishes a linear trajectory for the POI from an initial POI location to a target POI location. The method determines a calculated horizontal velocity and a calculated vertical velocity of the POI with respect to a gravitational coordinate system to cause the POI to have a resulting vector movement along the linear trajectory. The method calculates a boom angular velocity, an arm angular velocity, and an attachment angular velocity. The boom angular velocity, the arm angular velocity, and the attachment angular velocity combine to cause the POI to have the calculated horizontal velocity and the calculated vertical velocity. The method calculates a boom actuator hydraulic flow to cause the boom angular velocity, calculates an arm actuator hydraulic flow to cause the arm angular velocity, and calculates an attachment actuator flow to cause the attachment angular velocity. The method applies the boom actuator hydraulic flow to the boom actuator, applies the arm actuator hydraulic flow to the arm actuator, and applies the attachment actuator hydraulic flow to the attachment actuator. Until the POI reaches the target POI location, the method: determines a measured location of the POI and compares the measured location of the POI to an expected location of the POI to determine a POI location difference; modifies the calculated horizontal velocity and the calculated vertical velocity in response to the POI location difference to generate a modified calculated horizontal velocity and a modified calculated vertical velocity; calculates a modified boom angular velocity, a modified arm angular velocity, and a modified attachment angular velocity to cause the POI to have the modified calculated horizontal velocity and the modified calculated vertical velocity; calculates a modified boom actuator hydraulic flow, a modified arm actuator hydraulic flow, and a modified attachment actuator hydraulic flow to produce the modified boom angular velocity, the modified arm angular velocity, and the modified attachment angular velocity; and applies the modified boom hydraulic actuator flow to the boom actuator, applies the modified arm actuator hydraulic flow to the arm actuator, and applies the modified attachment actuator hydraulic flow to the attachment actuator to move the POI toward the POI target location.

In certain embodiments in accordance with this aspect, the linear trajectory is generally horizontal with respect to the gravitational coordinate system, and the calculated vertical velocity with respect to the gravitational coordinate system is zero. In certain embodiments in accordance with this aspect, the linear trajectory is generally vertical with respect to the gravitational coordinate system, and the calculated horizontal velocity with respect to the gravitational coordinate system is zero. In certain embodiments in accordance with this aspect, the linear trajectory is sloped with respect to the gravitational coordinate system, and the calculated horizontal velocity and the calculated vertical velocity with respect to the gravitational coordinate system both have respective non-zero magnitudes.

In certain embodiments in accordance with this aspect, an object is attached to the attachment. In certain embodiments, the attachment is an excavator bucket.

In certain embodiments, the attachment is a sweeper. In certain embodiments, the attachment is a ground penetration scanner. In certain embodiments, the attachment is a jackhammer.

In certain embodiments in accordance with this aspect, the calculated horizontal velocity of the POI is responsive to a horizontal velocity command from an operator of the work machine to cause horizonal movement of the POI. In certain embodiments in accordance with this aspect, the calculated vertical velocity of the POI is responsive to a vertical velocity command from an operator of the work machine to cause vertical movement of the POI. In certain embodiments, the vertical movement includes a first linear movement portion and a second arcuate movement portion. In certain embodiments in accordance with this aspect, the calculated horizontal velocity of the POI is responsive to a horizontal velocity command from an operator of the work machine, and the calculated vertical velocity of the POI is responsive to a vertical velocity command from the operator of the work machine to cause inclined movement of the POI.

Another aspect of the embodiments disclosed herein is a controller that controls the respective actuators of a boom, an arm, and an attachment of a work machine to cause the boom, the arm, and the attachment to have respective selected angular velocities about respective pivot locations. The controller is configured to receive an initial location and a target location for a point-of-interest (POI) of the attachment of the work machine. The controller is further configured to establish a linear trajectory for the POI from the initial location to the target location. The controller is further configured to determine a calculated horizontal velocity and a calculated vertical velocity of the POI with respect to a gravitational coordinate system to cause the POI to have a resulting vector movement along the linear trajectory. The controller is further configured to calculate a boom angular velocity, an arm angular velocity, and an attachment angular velocity. The boom angular velocity, the arm angular velocity, and the attachment angular velocity combine to cause the POI to have the calculated horizontal velocity and the calculated vertical velocity. The controller is further configured to calculate a boom actuator hydraulic flow to cause the boom angular velocity, to calculate an arm actuator hydraulic flow to cause the arm angular velocity, and to calculate an attachment actuator hydraulic flow to cause the attachment angular velocity. The controller is further configured to issue hydraulic flow commands to apply the boom actuator hydraulic flow to the boom actuator, to apply the arm actuator hydraulic flow to the arm actuator, and to apply the attachment actuator hydraulic flow to the attachment actuator. Until the POI reaches the target location, the controller is configured to determine a measured location of the POI and compare the measured location of the POI to an expected location of the POI to determine a POI location difference. The controller is configured to modify the calculated horizontal velocity and the calculated vertical velocity in response to the POI location difference to generate a modified calculated horizontal velocity and a modified calculated vertical velocity. The controller is configured to calculate a modified boom angular velocity, a modified arm angular velocity, and a modified attachment angular velocity to cause the POI to have the modified calculated horizontal velocity and the modified calculated vertical velocity. The controller is configured to calculate a modified boom actuator hydraulic flow, a modified arm actuator hydraulic flow, and a modified attachment actuator hydraulic flow to produce the modified boom angular velocity, the modified arm angular velocity, and the modified attachment angular velocity. The controller is configured to issue hydraulic flow commands to apply the modified boom hydraulic actuator flow to the boom actuator, apply the modified arm hydraulic actuator flow to the arm actuator, and apply the modified attachment actuator hydraulic flow to the attachment actuator to move the POI toward the POI target location.

In certain embodiments in accordance with this aspect, the linear trajectory is generally horizontal with respect to the gravitational coordinate system, and the calculated vertical velocity is zero to cause horizontal movement of the POI. In certain embodiments in accordance with this aspect, the linear trajectory is generally vertical with respect to the gravitational coordinate system, and the calculated horizontal velocity is zero to cause vertical movement of the POI. In certain embodiments, the vertical movement includes a first linear movement portion and a second arcuate movement portion. In certain embodiments, the linear trajectory is sloped with respect to the gravitational coordinate system, and the calculated horizontal velocity and the calculated vertical velocity both have respective non-zero magnitudes to cause inclined movement of the POI.

Numerous objects, features, and advantages of the embodiments set forth herein will be readily apparent to those skilled in the art upon reading of the following disclosure when taken in conjunction with the accompanying drawings.

DETAILED DESCRIPTION

Figure 1:
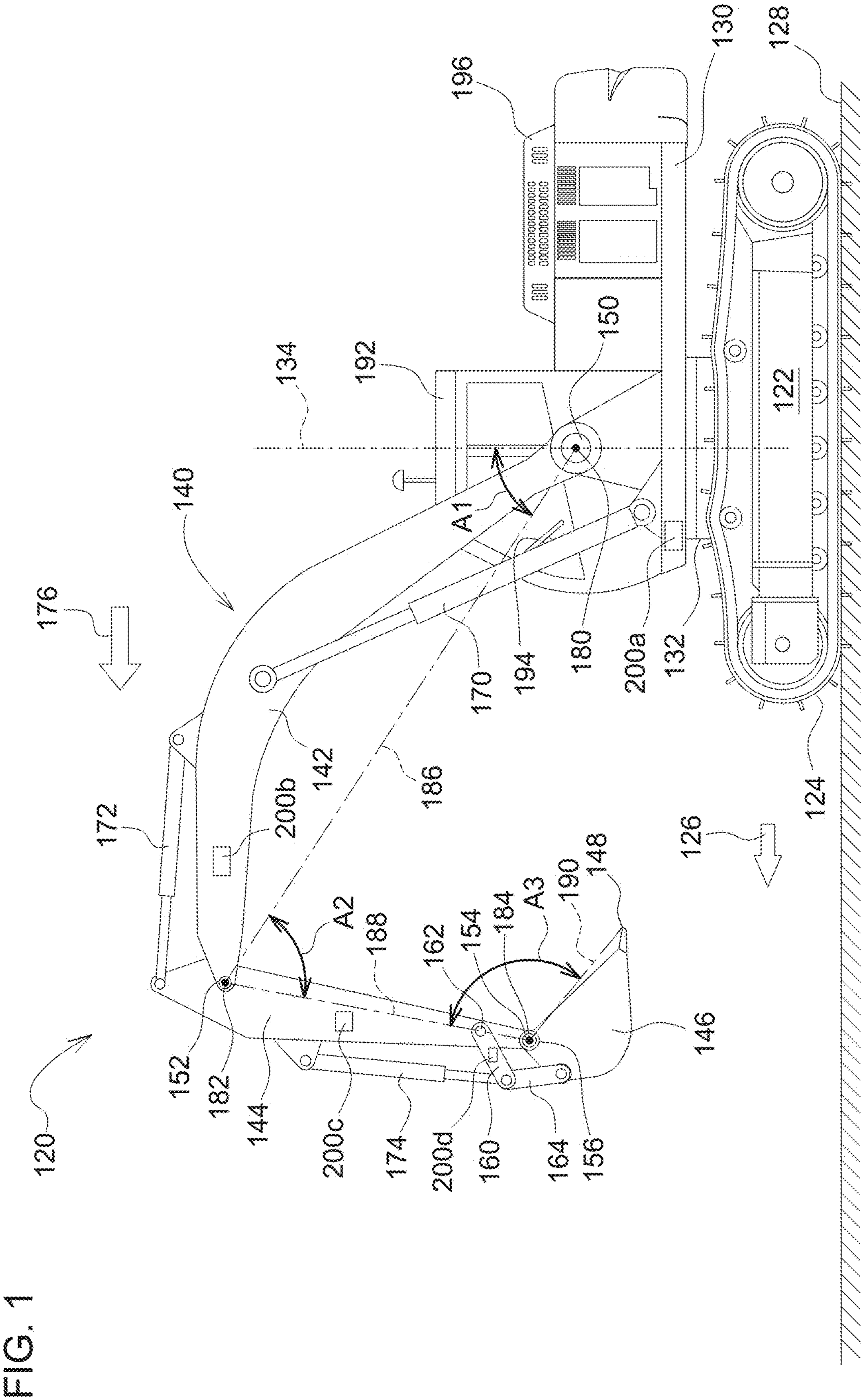
FIG. 1 is a side elevation view of the work vehicle of FIG. 1, the view in FIG. 2 including an attachment (working tool) embodied as an excavator bucket.
Figure 2:
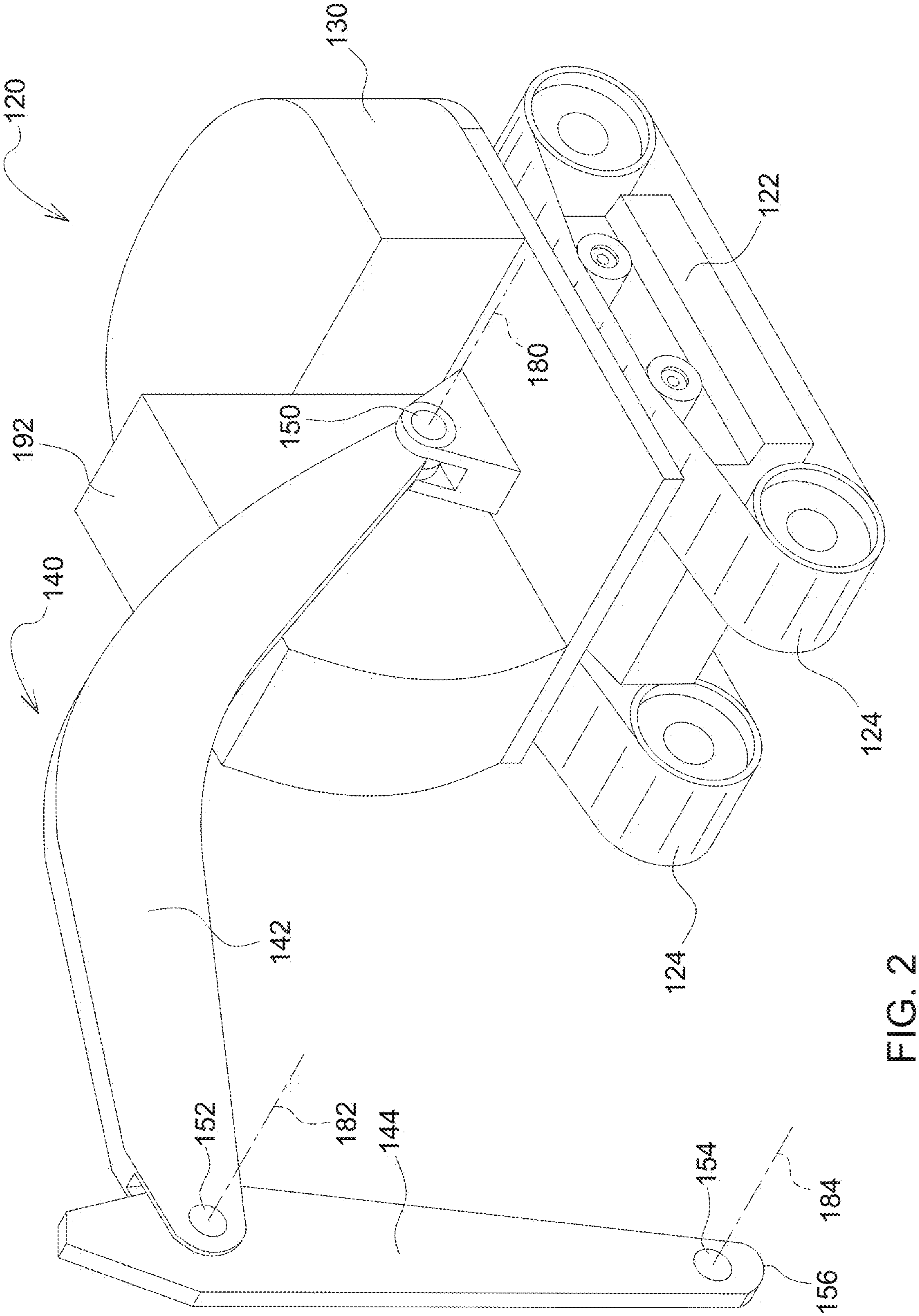
FIG. 2 is a simplified perspective view of the self-propelled work vehicle of FIG. 1, the view in FIG. 2 showing pivot axes of the implement of the work vehicle.

FIGS. 1 and 2 depict a representative self-propelled work vehicle 120 in the form of, for example, a tracked excavator machine. The work vehicle includes an undercarriage 122, which includes first and second ground engaging units 124 (e.g., tracks). The undercarriage includes respective first and second travel motors (not shown) for driving the first and second ground engaging units. The ground engaging units can be driven at the same velocity to move the undercarriage forward (e.g., in a forward direction indicated by an arrow 126 in FIG. 1) or backward (e.g., in a direction opposite the arrow 126) with respect to underlying terrain 128 (e.g., ground or other material supporting the undercarriage). The ground engagement units can also be driven at different velocities to enable the undercarriage to turn with respect to the terrain at an angle with respect to the forward direction represented by the arrow 126.

A main frame 130 is supported from the undercarriage 122 by a swing bearing 132 (FIG. 1) such that the main frame is pivotable about a main frame pivot axis 134 (FIG. 1) relative to the undercarriage. A swing motor (not shown) is configured to pivot the main frame on the swing bearing about the pivot axis relative to the undercarriage.

In the illustrated embodiment wherein the work vehicle 120 is an excavator, a work implement 140 extends from the main frame 130. In FIGS. 1 and 2, the work implement is configured as a boom assembly. The work implement includes conventional components in the form of a boom 142, an arm 144, and an attachment 146. The attachment is shown in FIG. 1. The attachment includes a point-of-interest (POI) 148, which engages portions of terrain (or other materials) to be moved or removed. The attachment can also be referred to as a working tool. In FIG. 1, the attachment (working tool) is embodied in an excavator bucket (also referred to as a shovel); however, as discussed below, the attachment can be embodied as other devices.

The boom 142 is pivotally connected to the main frame by a boom-to-frame linkage joint 150, which provides a pivot axis for the boom. The arm is pivotally connected to the boom at an arm-to-boom linkage joint 152. In the illustrated embodiment, the attachment 146 in FIG. 1 is an excavator bucket, which is pivotally connected to the arm 144 at an attachment-to-arm linkage joint 154, which is positioned near a free end 156 of the arm. In the illustrated embodiment, a first end of a dogbone connector 160 is pivotally connected to the arm at a dogbone-to-arm linkage joint 162, which is displaced from the free end of the arm. A second end of the dogbone connector is pivotally connected to a tool link 164. In the context of the illustrated (excavator) work vehicle 120, the tool link is a bucket link.

The boom 142 is caused to move pivotally with respect to the main frame 130 by a boom actuator 170. The boom actuator can be a hydraulic motor. In the illustrated embodiment, the boom actuator is a hydraulic piston-cylinder unit that is selectively provided with pressurized hydraulic fluid to move the piston within the cylinder to extend or extract the piston. The pressurized hydraulic fluid is provided by a hydraulic system (not shown) and is controlled by manual controls, automatic controls, or a combination of manual and automatic controls. In a similar manner, the arm 144 is caused to pivot with respect to the boom by an arm actuator 172. The attachment (bucket) 146 is caused to pivot with respect to the arm by an attachment actuator 174 acting on the attachment via the dogbone connector 160, the dogbone-to-arm linkage joint 162, and the tool link 164.

The work implement 140 extends from the main frame 130 along a working direction (represented by an arrow 176) of the work implement. In FIG. 1, the working direction is referenced to the main frame. Although illustrated as parallel to the forward direction (arrow 126) of the undercarriage 122, the working direction of the work implement can be at an angle to the forward direction depending on the rotational position of the main frame with respect to the undercarriage. The working direction can also be described as a working direction of the boom 142. The center of the boom-to-frame linkage joint 150 defines a first pivot axis 180 (FIG. 2). The center of the arm-to-boom linkage joint 152 defines a second pivot axis 182 (FIG. 2). The center of the attachment-to-arm linkage joint 154 defines a third pivot axis 184 (FIG. 2). The pivot axes are represented as dots in FIG. 1.

As shown in FIG. 1, the first pivot axis 180 and the second pivot axis 182 are connected by a boom centerline 186 that is a vector representation of the boom 142. As the boom rotates with respect to the first pivot axis at the boom-to-frame linkage joint 150, the arm-to-boom linkage joint 152 and the second pivot axis remain at a constant radial distance from the first pivot axis as defined by the boom centerline. Thus, although the boom has a curved shape, the boom centerline can be used to analyze the boom movement. As defined herein, the boom centerline is oriented at a first (boom-to-frame) angle A1 with respect to the main frame (vertical) pivot axis 134. When the boom is rotated clockwise to raise the boom, the first angle A1 decreases. When the boom is rotated counterclockwise to lower the boom, the first angle A1 increases.

As further shown in FIG. 1, the second pivot axis 182 and the third pivot axis 184 are connected by an arm centerline 188 that is a vector representation of the arm 144. As the arm rotates with respect to the second pivot axis at the arm-to-boom linkage joint 152, the attachment-to-arm linkage joint 154 and the third pivot axis remain at a constant radial distance from the second pivot axis as defined by the arm centerline. Thus, the arm centerline can be used to analyze the arm movement. As defined herein, the arm centerline is oriented at a second (arm-to-boom) angle A2 with respect to the boom centerline 186. When the arm is rotated counterclockwise to draw the arm closer to the boom 142, the second angle A2 decreases. When the arm is rotated clockwise to extend the arm away from the boom, the second angle A2 increases.

As further shown in FIG. 1, the third pivot axis 184 and the point-of-interest 148 of the attachment 146 are connected by an attachment centerline 190 that is a vector representation of the attachment when the position of the point-of-interest is being controlled as described below. As the attachment rotates with respect to the third pivot axis at the attachment-to-arm linkage joint 154, the point-of-interest remains at a constant radial distance from the third pivot axis as defined by the attachment centerline. Thus, the attachment centerline can be used to analyze the attachment movement. As defined herein, the attachment centerline is oriented at a third (attachment-to-arm) angle A3 with respect to the arm centerline 188. When the attachment is rotated counterclockwise to draw the point-of-interest closer to the arm 142, the third angle A3 decreases. When the boom is rotated counterclockwise to extend the point-of-interest away from the arm, the third angle A3 increases.

As described herein, control of the work implement 140 relates to controlling the positioning of any one or more of the associated components (e.g., the boom 142, the arm 144, and the attachment 146) to control the movement of the point-of-interest 148 of the attachment with respect to material to be manipulated (e.g., the material to be moved or removed).

The actuators 170, 172, 174 of the work implement 140 can be selectively actuated to pivotally move the boom 142 with respect to the respective boom-to-frame linkage joint 150 (e.g., about the first pivot axis 180), to pivotally move the arm 144 with respect to the arm-to-boom linkage joint 152 (e.g., about the second pivot axis 182), and to pivotally move the attachment 146 with respect to the attachment-to-arm linkage joint 154 (e.g., about the third pivot axis 184). By coordinating the movements of the boom, the arm, and the attachment of the work implement, the point-of-interest of the attachment can be moved along a selected trajectory at a target velocity.

In the illustrated embodiment, extending the boom actuator 170 causes the boom 142 to rotate clockwise, which causes the first angle A1 to decrease. Retracting the boom actuator causes the boom to rotate counterclockwise, which causes the first angle A1 to increase. Extending the arm actuator 172 causes the arm 144 to rotate counterclockwise, which causes the second angle A2 to decrease. Retracting the arm actuator causes the arm to rotate clockwise, which causes the second angle A2 to increase. Extending the attachment actuator 174 causes the attachment 146 and the point-of-interest 148 to rotate counterclockwise, which causes the third angle A3 to decrease. Retracting the attachment actuator causes the attachment and the point-of-interest to rotate clockwise, which causes the third angle A3 to increase.

In the illustrated embodiment, an operator's cab 192 is located on the main frame 130. In the illustrated embodiment, the operator's cab and the work implement 140 are both mounted on the main frame so that the operator's cab faces in the working direction (arrow 176) of the work implement. In the illustrated embodiment, a control station 194 is located in the operator's cab.

The main frame 130 also supports an engine 196 for powering the work vehicle 120. The engine can be a diesel internal combustion engine or another source of power. In the illustrated embodiment, the engine drives at least one hydraulic pump (not shown) to provide hydraulic power to the various operating systems of the work vehicle.

In illustrated embodiment, a sensor system 200 (see FIG. 1) is mounted on the work vehicle 120. As illustrated in FIG. 1, the sensor system includes a first sensor 200*a* mounted to the main frame 130, a second sensor 200*b* mounted to the boom 142, a third sensor 200*c* mounted to the arm 144, and a fourth sensor 200*d* mounted to the dogbone connector 160. In the illustrated embodiment, each of the first through fourth sensors is an inertial measurement unit (IMU). IMUs are tools that capture a variety of motion-based and position-based measurements, including, but not limited to, velocity, acceleration, angular velocity, and angular acceleration. Additional sensors can be included in other embodiments.

An accelerometer is an electro-mechanical device or tool used to measure acceleration (e.g., in meters per seconds squared ($m/s^2$)), which is defined as the rate of change of velocity (e.g., in meters per second (m/s)) of an object. Accelerometers sense either static forces (e.g., gravity) or dynamic forces of acceleration (e.g., vibration and movement). An accelerometer may receive sense elements measuring the force due to gravity. By measuring the quantity of static acceleration due to gravity of the Earth, an accelerometer may provide data as to the angle the object is tilted with respect to the Earth, the angle of which may be established in an x-axis, y-axis, and z-axis gravitational coordinate frame. However, where the object is accelerating in a particular direction, such that the acceleration is dynamic (as opposed to static), the accelerometer produces data which does not effectively distinguish the dynamic forces of motion from the force due to gravity by the Earth. A gyroscope is a device used to measure changes in orientation, based upon the object's angular velocity (rad/s) or angular acceleration ($rad/s^2$). A gyroscope may constitute a mechanical gyroscope, a micro-electro-mechanical system (MEMS) gyroscope, a ring laser gyroscope, a fiber-optic gyroscope, and/or other gyroscopes as are known in the art. Principally, a gyroscope is employed to measure changes in angular position of an object in motion, the angular position of which may be established in an x-axis, y-axis, and z-axis gravitational coordinate frame.

Figure 3:
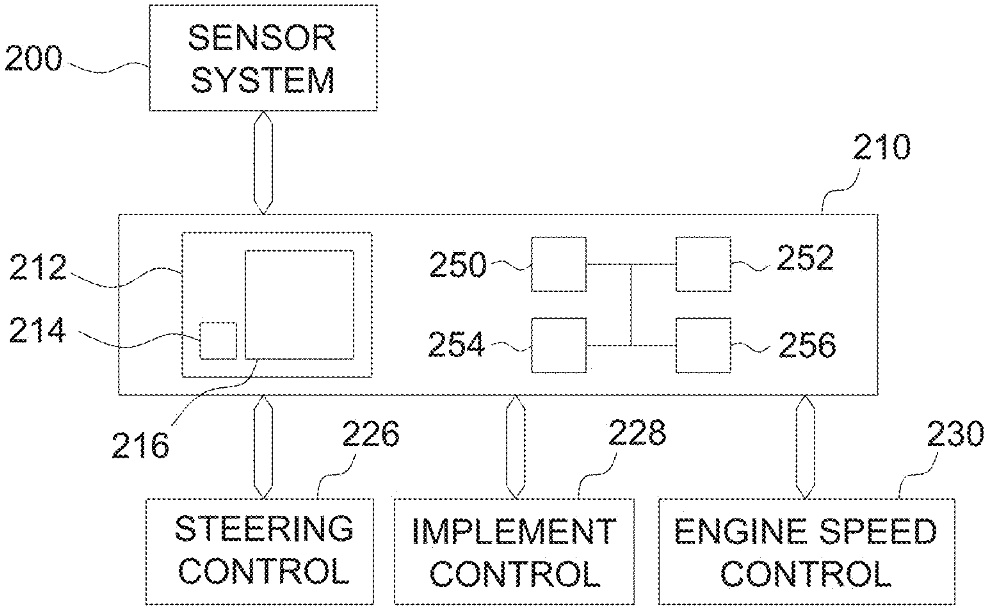
FIG. 3 is a schematic representation of a machine control system for the work vehicle of FIGS. 1 and 2.

As schematically illustrated in FIG. 3, the self-propelled work vehicle 120 includes a control system that includes a machine controller 210. The machine controller can be part of the machine control system of the working machine, or it can be a separate machine control module. The machine controller is optionally mounted in the operator's cab 192 at the control station 194. The machine controller can include a user interface 212 such as a control panel. The user interface can include a user interface tool 214 such as an input/output device (e.g., a keyboard, a joystick, or the like.) The user interface can also include a display 216.

The machine controller 210 is configured to receive input signals from some or all of various sensors 200*a* . . . 200*d* collectively defining the sensor system 200. The sensors of the sensor system may typically be discrete in nature, but signals representative of more than one input parameter may be provided from the same sensor. The sensor system can also refer to signals provided from the machine control system.

IMUs include a number of sensors including, but not limited to, accelerometers, which measure (among other things) velocity and acceleration, gyroscopes, which measure (among other things) angular velocity and angular acceleration, and magnetometers, which measure (among other things) strength and direction of a magnetic field. Generally, as discussed above, an accelerometer provides measurements, with respect to (among other things) force due to gravity, while a gyroscope provides measurements, with respect to (among other things) rigid body motion. The magnetometer provides measurements of the strength and the direction of the magnetic field, with respect to (among other things) known internal constants, or with respect to a known, accurately measured magnetic field. The magnetometer provides measurements of a magnetic field to yield information on positional, or angular, orientation of the IMU; similarly to that of the magnetometer, the gyroscope yields information on a positional, or angular, orientation of the IMU. Accordingly, the magnetometer may be used in lieu of the gyroscope, or in combination with the gyroscope, and complementary to the accelerometer, in order to produce local information and coordinates on the position, motion, and orientation of the IMU.

The machine controller 210 can be configured to produce outputs to the user interface 212 for displaying information to the human operator. In addition, or in the alternative, the machine controller can be configured to generate control signals for controlling the operation of respective actuators, or generate signals for indirect control via intermediate control units, associated with a machine steering control system 226, a machine implement control system 228, and an engine speed control system 230. The machine controller can generate control signals for controlling the operation of various actuators, such as hydraulic motors or hydraulic piston-cylinder units of the boom actuator 170, the arm actuator 172, and the attachment actuator 174. The control signals from the controller can be received by electro-hydraulic control valves associated with the actuators such that the electro-hydraulic control valves control the flow of hydraulic fluid to and from the respective hydraulic actuators to control the actuation thereof in response to the control signal from the controller.

In the illustrated embodiment, the machine controller 210 includes, or is associated with, a processor 250, a computer readable medium 252, a communication unit 254, data storage 256 such as for example a database network, and the aforementioned user interface (control panel) 212 having the display 216 and the user interface tool (e.g., input/output device) 214 by which a human operator may input instructions to the controller. The machine controller described herein may be a single controller having all of the described functionality, or it may include multiple machine controllers wherein the described functionality is distributed among the multiple controllers. The data storage may generally encompass hardware such as volatile or non-volatile storage devices, drives, memory, or other storage media, as well as one or more databases residing thereon.

Various "computer-implemented" operations, steps or algorithms as described in connection with the machine controller 210 or in connection with alternative but equivalent computing devices or systems can be embodied directly in hardware, in a computer program product such as a software module executed by the processor 250, or in a combination of the two. The computer program product can reside in RAM memory, flash memory, ROM memory, EPROM memory, EEPROM memory, registers, hard disk, a removable disk, or any other form of computer-readable medium 252 known in the art. An exemplary computer-readable medium can be coupled to the processor such that the processor can read information from, and write information to, the memory/storage medium. In the alternative, the computer-readable medium can be integral to the processor. The processor and the computer-readable medium can reside in an application-specific integrated circuit (ASIC). The ASIC can reside in a user terminal. In the alternative, the processor and the computer-readable medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices (e.g., a combination of a digital signal processor (DSP) and a microprocessor), a plurality of microprocessors, one or more microprocessors in conjunction with a DSP core, or any other such configuration.

The communication unit 254 can support or provide communications between the machine controller 210 and external systems or devices, and/or support or provide communication interface with respect to internal components of the self-propelled work vehicle 120. The communication unit can include wireless communication system components (e.g., via cellular modem, Wi-Fi® systems, Bluetooth® systems, or the like) and/or may include one or more wired communications terminals such as universal serial bus ports.

Figure 4:
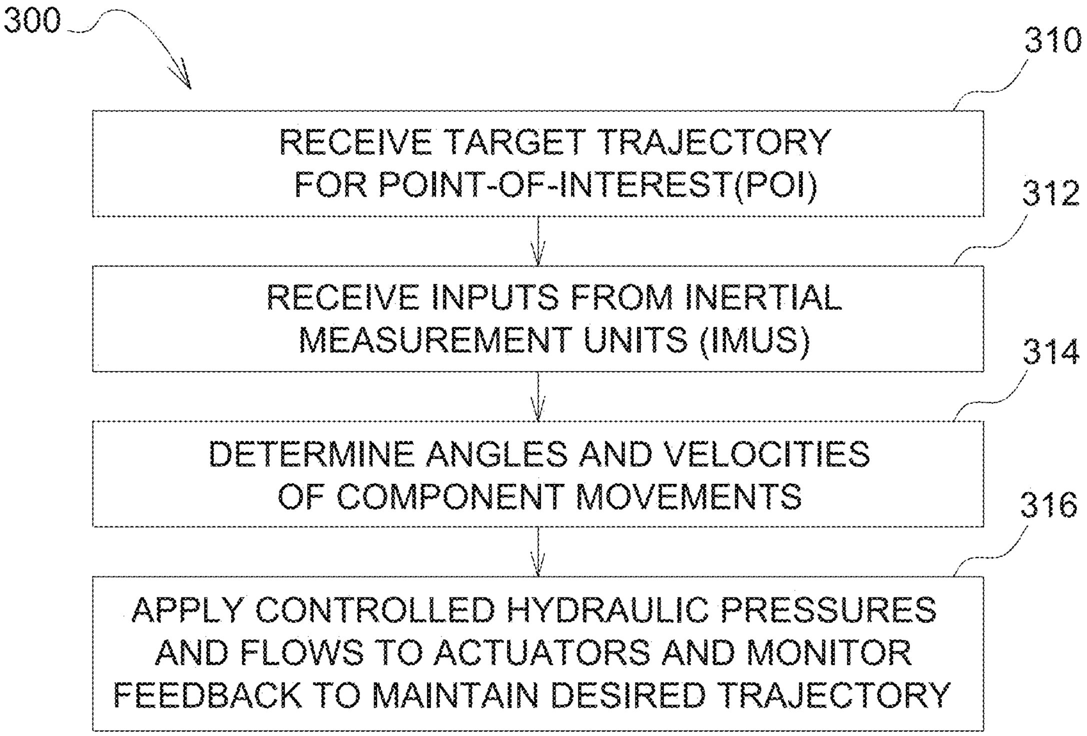
FIG. 4 illustrates a flowchart of an exemplary embodiment of a method for tracking motion of linkage joints for the work vehicle of FIGS. 1 and 2 to achieve a desired trajectory for the point-of-interest of an attachment.

FIG. 4 illustrates a flowchart of an exemplary embodiment of a method 300 for tracking motion of linkage joints for the self-propelled work vehicle 120 to achieve a desired trajectory for the point-of-interest 148. In a first step 310, the method receives the target trajectory for moving the point-of-interest. For example, the target trajectory can be a predetermined target trajectory that forms a portion of an overall terrain forming (e.g., excavation) plan. In a second step 312, the method receives inputs from the above-described sensors (IMUs) 200*a*, 200*b*, 200*c*, 200*d*, and the method determines a current location of the point-of-interest. In a third step 314, the method uses inverse kinematics or other suitable techniques to determine various angles and pivoting velocities of the components of the work implement 140 to achieve the target velocity of the point-of-interest. In a fourth step 316, the method applies controlled hydraulic pressures to the actuators 170, 172, 174 to move the boom 142, the arm 144, and the attachment 146 to achieve the determined angles and pivoting velocities. In the fourth step, the method receives feedback from the IMUs, which enables the method to adjust the hydraulic pressures as needed to maintain the desired trajectory.

As discussed above, for some operational procedures of the work machine 120, a linear trajectory is needed. For example, to move a heavy object from one location to another while maintaining the object level requires the trajectory to be horizontal in the gravitational coordinate system with no vertical movement in the gravitational coordinate system. As another example, to lift an object out of a constrained location (e.g., a hole or a container) requires the trajectory to be vertical in the gravitational coordinate system with no horizonal movement in the gravitational coordinate system. As a further example, the attachment 146 configured as a bucket can be removed and replaced with a sweeper (described below), and the sweeper is maintained at a constant level to remove debris from a surface. When such movements are performed by manual manipulation of controls by an operator, the movements tend to be jerky with unwanted motion in directions other than the desired trajectory. In the illustrated embodiment, the machine controller 210 of FIG. 3 is configured to implement an algorithm to accomplish a linear trajectory to avoid the continual manipulation of the controls by an operator.

FIGS. 5-8 illustrated the operation of the work machine 120 in moving objects along linear trajectories. The following discussion refers to angles between the components of the work implement 140. As discussed above, the relevant angles are illustrated in FIG. 1 as the first (boom-to-frame) angle A1, the second (arm-to-boom) angle A2, and the third (attachment-to-arm) angle A3. Because of lack of illustration space, the three angles are not shown in FIGS. 5-8; however, the references to the three angles are understood to be references to the angles shown in FIG. 1.

In FIGS. 5-8, the work machine 120 is illustrated with the ground-engaging units 124 resting on the substantially horizontal surface 128, as defined in the gravitational coordinate system, such that the pivot axis 134 is vertical in the gravitational coordinate system; however, the following discussion is also applicable when the work machine is positioned on a sloped surface. In the following discussion, "horizontal" and "vertical" are referenced to the gravitational coordinate system.

Figure 5:
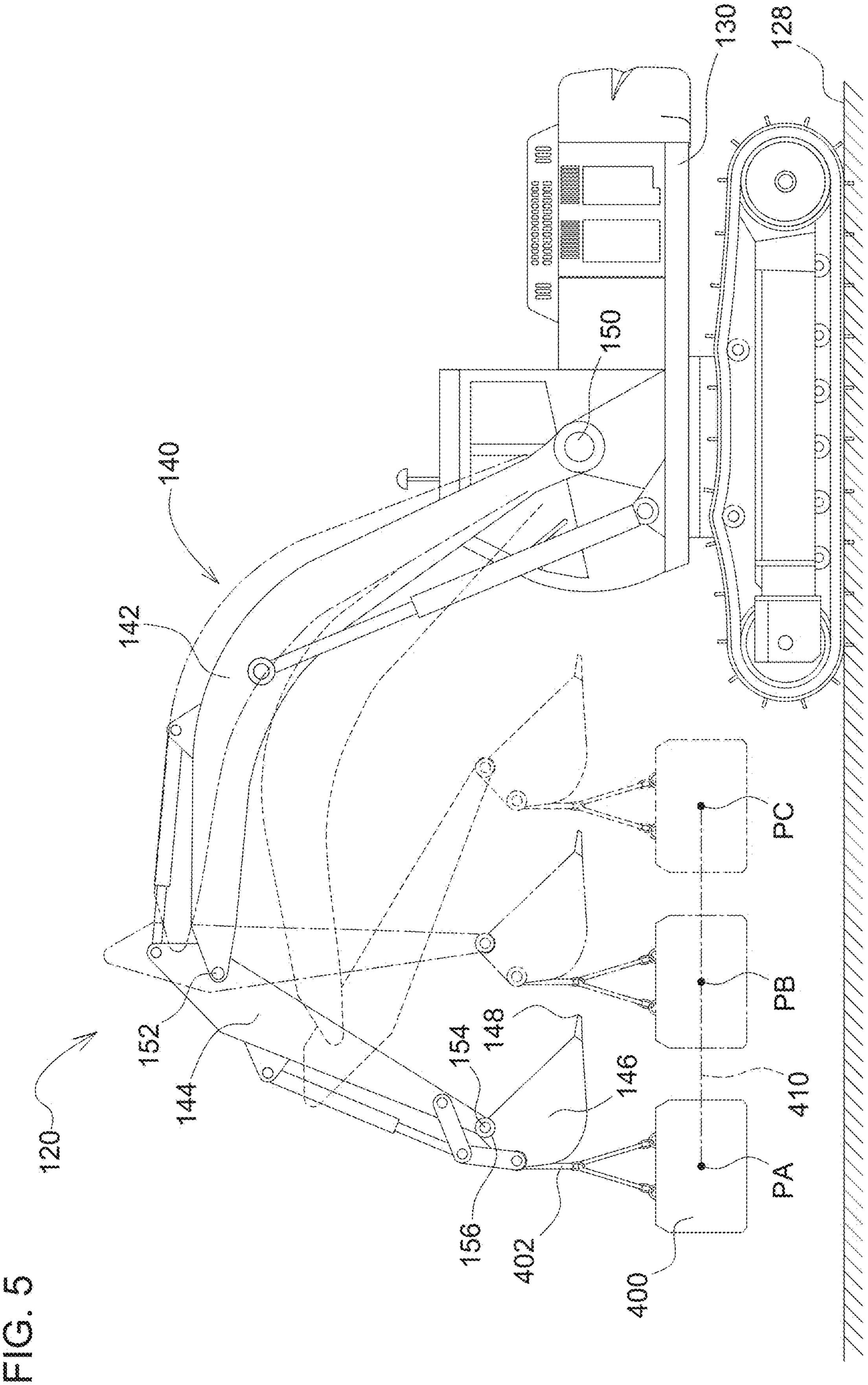
FIG. 5 illustrates the work vehicle of FIGS. 1 and 2 showing the operation of the work vehicle to achieve linear horizontal movement of an object attached to the attachment of the work vehicle, wherein respective starting positions of the boom, the arm, the attachment, and the object are shown in solid lines, respective mid-positions of the boom, the arm, the attachment, and the object are shown in a first set of dashed lines, and respective end positions of the arm, the attachment, and the object are shown in a second set of dashed lines.

FIG. 5 illustrates the work machine 120 configured to move an object 400 suspended by a set 402 of cables from the attachment 146. In the illustrated embodiment, the set of cables is attached to the attachment near the lower end of the tool link 164. In other embodiments (not shown), the set of cables can be attached elsewhere. For example, the set of cables can be supported at the point-of-interest 148. The object is moved horizontally from an initial location PA (defined at the approximate center of the object) to a target location PC via a middle location PB along a horizontal centerline 410. The middle location is representative of one of continuum of locations between the initial location and the target location. For purposes of illustration, the object has a box-like shape. For example, the object can be a crate that contains materials, can be a cut stone (e.g., marble, granite, or the like), can be a bundle of materials, or can be one or more of many heavy materials to be moved from the initial location to the target location. The object can also have other shapes (e.g., cylindrical).

As illustrated for the initial location PA in FIG. 5, each of the first (boom-to-frame) angle A1, the second (arm-to-boom) angle A2, and the third (attachment-to-arm) angle A3 has a respective first angular magnitude. As stated above, the three angles A1, A2, and A3 are identified in FIG. 1. As the object is moved from the initial location PA to the middle location PB, the three angles vary to respective second angular magnitudes such that the first angle A1 decreases as the boom rotates clockwise, the second angle A2 decreases as the arm rotates counterclockwise, and the third angle A3 increases as the attachment rotates clockwise. As the object is moved from the middle location PB to the target location PC, the magnitudes of the three angles continue to vary. The first angle A1 now increases. The second angle A2 continues to decrease. The third angle A3 continues to increase. In each of the three locations, the point-of-interest 148 of the attachment is maintained at a constant orientation and elevation with respect to the horizontal centerline 410, which causes the center of the object to also be maintained at a constant elevation with respect to the terrain. FIG. 5 illustrates the extreme difficulty for an operator to determine simultaneously an increased magnitude or a decreased magnitude for each of the three angles to maintain the object at a constant horizontal level.

Figure 6:
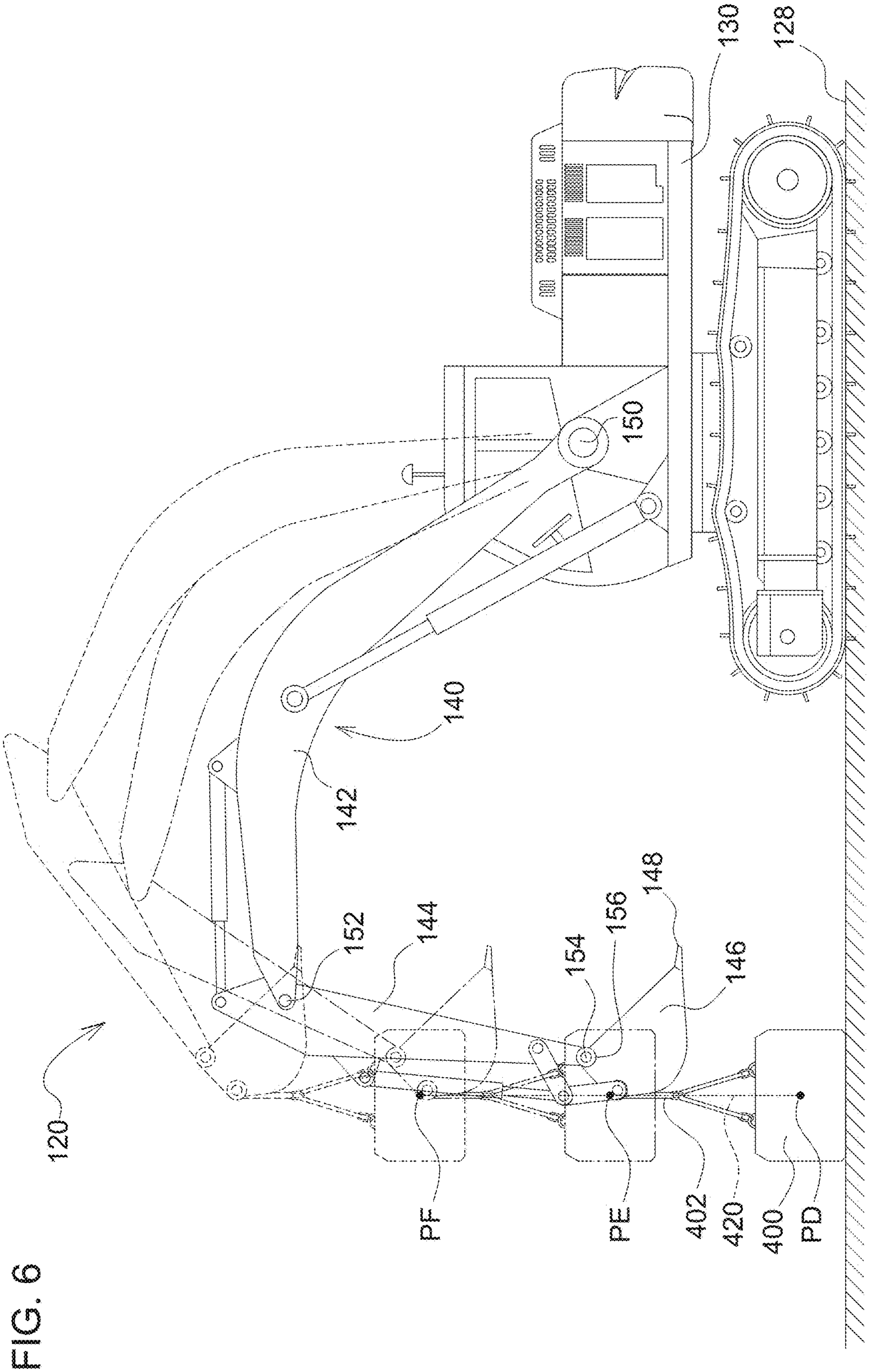
FIG. 6 illustrates the work vehicle of FIGS. 1 and 2 showing the operation of the work vehicle to achieve linear vertical movement of an object attached to the attachment of the work vehicle, wherein respective starting positions of the boom, the arm, the attachment, and the object are shown in solid lines, respective mid-positions of the boom, the arm, the attachment, and the object are shown in a first set of dashed lines, and respective end positions of the arm, the attachment, and the object are shown in a second set of dashed lines.

FIG. 6 illustrates the work machine 120 configured to move the object 400 vertically from an initial location PD wherein the object is resting on the terrain 128 to an uppermost target location PF via a middle vertical location PE along a vertical centerline 420. The middle vertical location is representative of one of continuum of locations between the initial location and the target location.

As illustrated for the initial location PD in FIG. 6, each of the first (boom-to-frame) angle A1, the second (arm-to-boom) angle A2, and the third (attachment-to-arm) angle A3 has a respective first angular magnitude. As the object is moved upward from the initial location PD to the middle location PE, the three angles vary to respective second angular magnitudes such that the first angle A1 decreases, the second angle A2 increases, and the third angle A3 decreases. As the object is moved farther upward from the middle location PE to the target location PF, the three angles continue to vary. The first angle A1 continues to decrease. The second angle A2 continues to increase. The third angle A3 continues to decrease. In each of the three locations, the point-of-interest 148 of the attachment is maintained at a constant orientation and distance with respect to the vertical centerline 420, which causes the center of the object to maintained on the vertical centerline. FIG. 6 further illustrates the extreme difficulty for an operator to determine how much to increase or decrease each of the three angles simultaneously to maintain the object on the vertical centerline.

Figure 7:
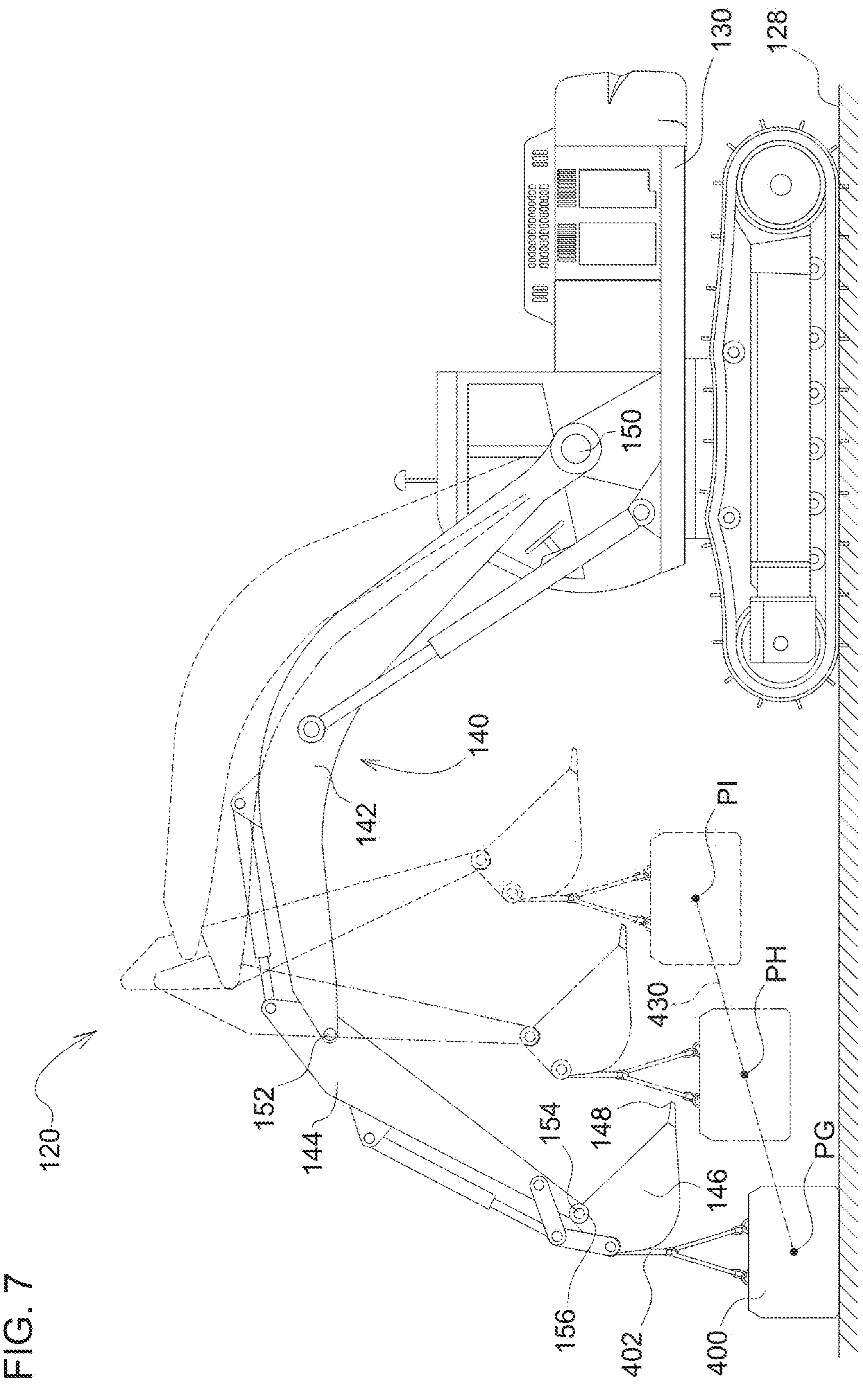
FIG. 7 illustrates the work vehicle of FIGS. 1 and 2 showing the operation of the work vehicle to achieve linear slanted (inclined) movement of an object attached to the attachment of the work vehicle, wherein respective starting positions of the boom, the arm, the attachment, and the object are shown in solid lines, respective mid-positions of the boom, the arm, the attachment, and the object are shown in a first set of dashed lines, and respective end positions of the arm, the attachment, and the object are shown in a second set of dashed lines.

FIG. 7 illustrates the work machine 120 configured to move the object 400 along a linear sloped trajectory from an initial location PG target location PI via a middle location PH along a sloped centerline 430 to cause slanted (inclined) movement of the object. The middle vertical location is representative of one of continuum of locations between the initial location and the target location.

As illustrated for the initial location PG in FIG. 7, each of the first (boom-to-frame) angle A1, the second (arm-to-boom) angle A2, and the third (attachment-to-arm) angle A3 has a respective first angular magnitude. As the object is moved from the initial location PG to the middle location PH along the sloped centerline 430, the three angles vary such that the first angle A1 decreases, the second angle A2 decreases, and the third angle A3 increases. As the object moves farther upward and toward the main frame 130 along the sloped centerline from the middle location PH to the target location PI, the three angles continue to vary. The first angle A1 continues to decrease. The second angle A2 continues to decrease. The third angle A3 continues to increase. In each of the three locations, the point-of-interest 148 of the attachment is maintained at a constant orientation with respect to the sloped centerline, which causes the center of the object to be maintained on the sloped centerline. FIG. 7 further illustrates the extreme difficulty for an operator to determine how much to increase or decrease the three angles simultaneously to maintain the object on a constant sloped centerline.

Figure 8:
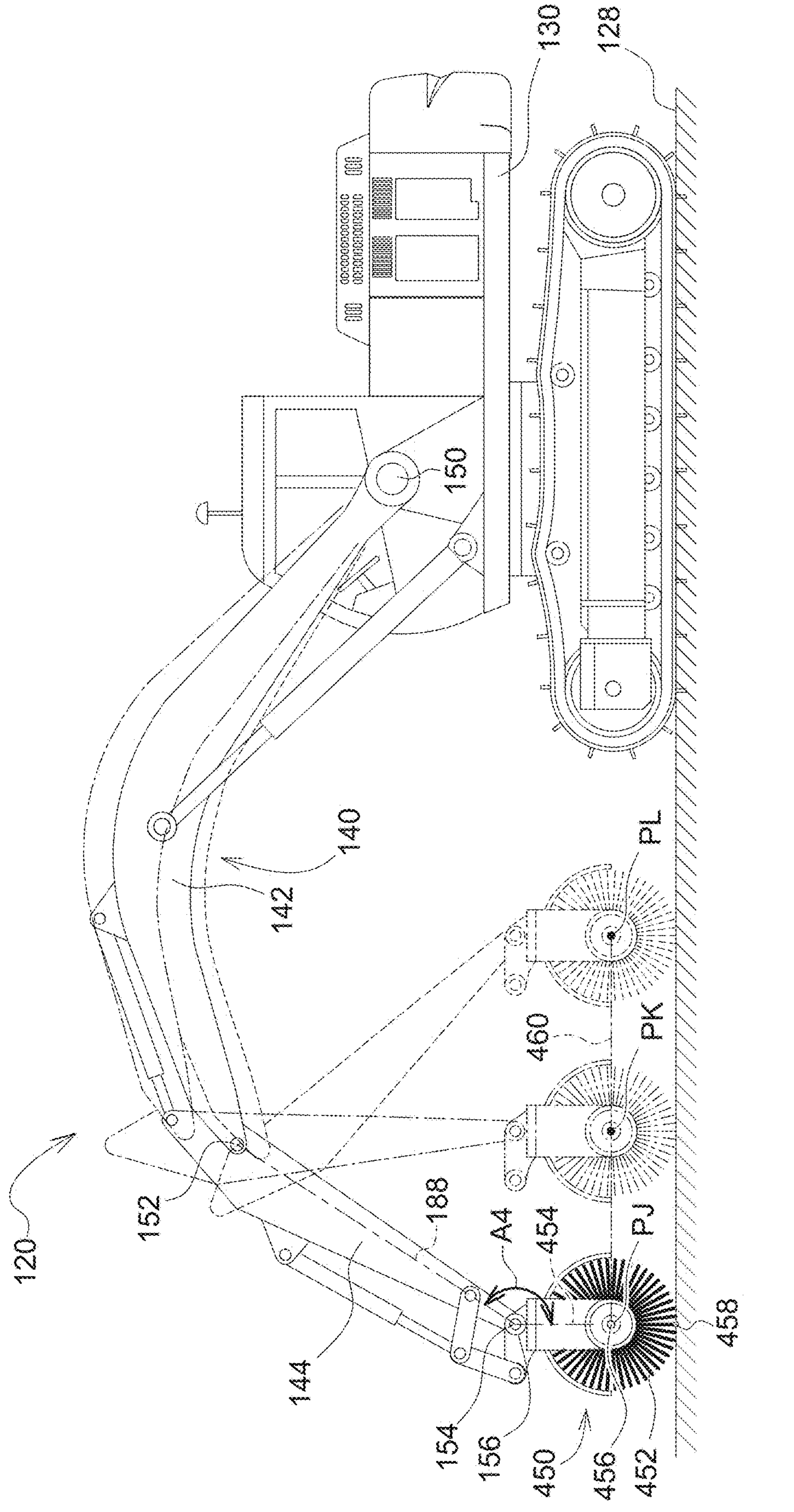
FIG. 8 illustrates the work vehicle of FIGS. 1 and 2 showing the operation of the work vehicle to achieve linear horizontal movement of a brush sweeper attached to the end of the arm as an attachment of the work vehicle, wherein respective starting positions of the boom, the arm, and the sweeper are shown in solid lines, respective mid-positions of the boom, the arm, and the sweeper are shown in a first set of dashed lines, and respective end positions of the arm, and the sweeper are shown in a second set of dashed lines.

FIG. 8 illustrates a further example of using the work machine 120 to move an object 450 along a linear trajectory. In FIG. 8, the attachment 146 of FIGS. 5-7 and the load 400 are removed; and a rotating brush unit (object 450) is connected directly to the free end 156 of the arm 144 at the attachment-to-arm joint 154. The brush unit can also be considered to be an attachment 450. The brush unit is coupled to hydraulic lines (not shown) and includes a hydraulic motor (not shown) to rotate a brush 452 with respect to the terrain 128. Because the attachment is removed in FIG. 8 and replaced with the brush unit, a new fourth (attachment-to-arm) angle A4 is defined in FIG. 8 as being between the arm centerline 188 and a vertical centerline 454 of the brush unit. The vertical centerline of the brush unit extends from the attachment centerline 190 at the center of the attachment-to-arm joint 154 to a rotational center 456 of the brush. In FIG. 8, the location of the tangential contact of the brush with the terrain 128 is defined as a point-of-interest 458 of the brush unit. In the illustrated embodiment, the point-of-interest of the brush unit is aligned with the vertical centerline of the brush unit. The first (boom-to-frame) angle A1 and the second (arm-to-boom) angle A2 are defined as shown in FIG. 1.

For the brush unit 450 to be effective in moving debris on the terrain 128, the brush 452 should be positioned in constant firm contact with the terrain. Thus, for flat terrain, the brush unit should be moved along a horizontal trajectory represented by a centerline 460 from an initial location PJ via a middle location PK to a target location PL. Each of the locations PJ, PK, and PL is defined at the center of rotation of the brush.

As the brush unit 450 is moved from the initial location PJ to the middle location PK, the three angles vary such that the first angle A1 decreases, the second angle A2 decreases, and the fourth angle A4 increases. As the object moves farther from the middle location PK to the target location PL, the three angles continue to vary. The first angle A1 now increases to a magnitude greater than the magnitude of the first angle A1 at the initial location PJ. The second angle A2 continues to decrease. The fourth angle A4 continues to increase. FIG. 8 further illustrates the extreme difficulty for an operator to determine how much to increase or decrease the three angles simultaneously to maintain the brush of the brush unit on a level trajectory in contact with the terrain.

In a further embodiment (not illustrated), the brush unit 450 can be replaced with a ground penetrating scanner (not shown). The scanner uses ground penetrating radar technology to locate pipes, cables, or other buried objects and to provide depth information. For the depth information provided by the scanner to be accurate, the scanner must be positioned on the surface of the terrain 128 or positioned at a known distance above the surface. Thus, the scanner must be moved along a centerline corresponding to the centerline 460 of FIG. 8.

Figure 9:
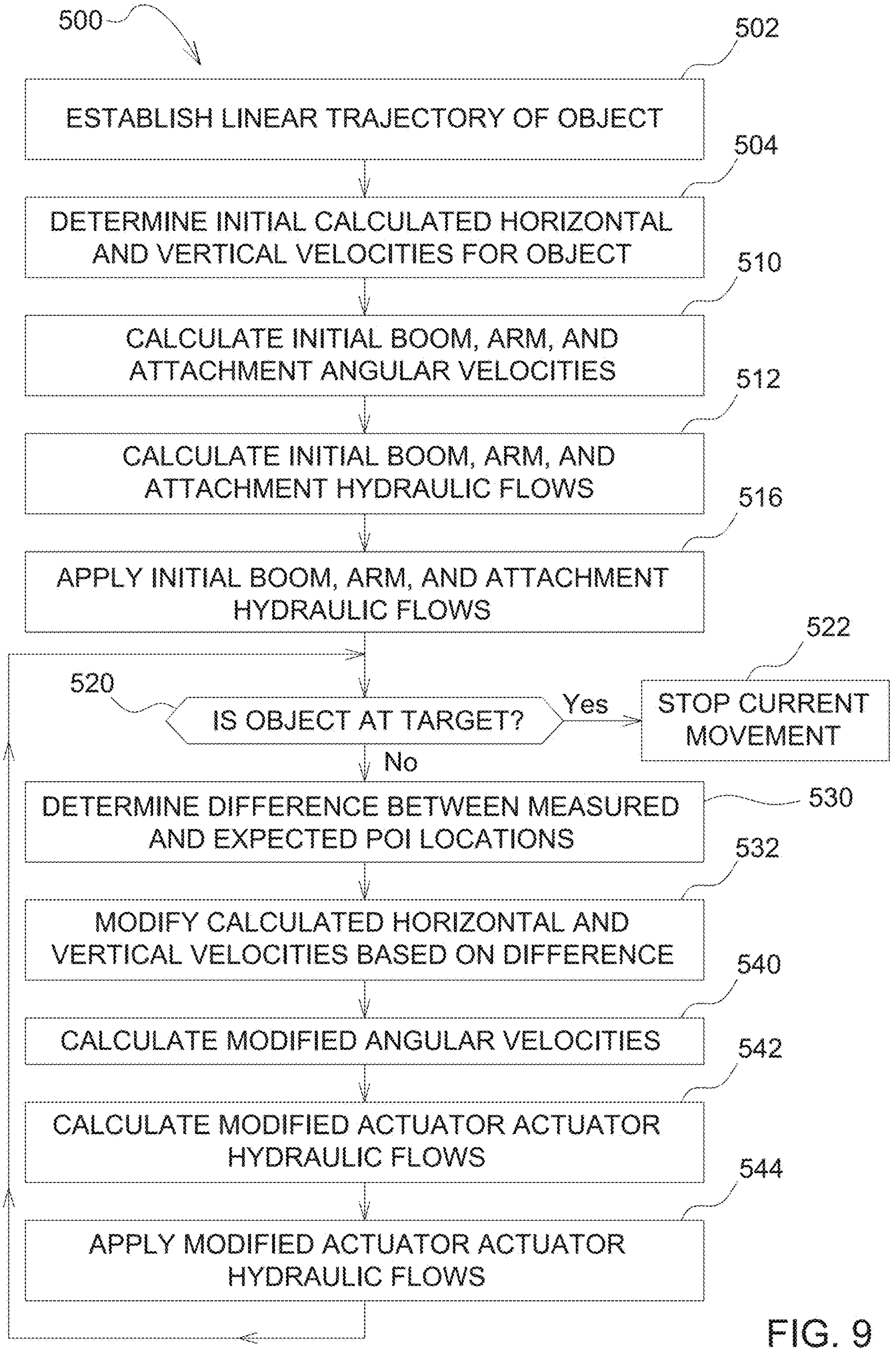
FIG. 9 illustrates a flowchart of the operation of the work vehicle of FIGS. 1-8 to achieve the linear trajectories of FIGS. 5-8.

In view of the foregoing, a need exists to automate the movement of the object 450 (e.g., the brush unit 450) attached directly to the free end 156 of the arm as shown in FIG. 8 or the object 400 connected to the attachment 146 as shown in FIGS. 5-7. In the illustrated embodiment, the controller 210 is configured with an algorithm 500 illustrated in FIG. 9. The algorithm implements a system and method that automatically maintains a linear trajectory for the object between an initial location and a target as shown in FIGS. 5-8 without requiring an operator to manipulate the controls to continuously vary the first (boom-to-frame) angle A1, the second (arm-to-boom) angle A2, and either the third (attachment-to-arm) angle A3 or the fourth (attachment-to-arm) angle A4. The following description is directed to the object 400 connected to the attachment; however, the description is also applicable to the brush unit or other object connected directly to the free end of the arm.

In a first step 502, the algorithm 500 establishes a linear trajectory for the object 400 between an initial location and a target location based on input from the operator of the work machine via the user interface tool 214 of FIG. 3. For example, in the illustrated embodiment, the user interface tool can be implemented as one or more joysticks or other manual input devices In a second step 504, the algorithm determines an initial calculated horizontal velocity and an initial calculated vertical velocity to move the object between the initial location and the target location along the linear trajectory. If the linear trajectory is horizontal, the initial calculated vertical velocity should be zero. If the linear trajectory is vertical, the initial calculated horizontal velocity should be zero. If the linear trajectory is sloped as shown in FIG. 7, both the initial calculated horizontal velocity and the initial calculated vertical velocity will be non-zero.

In a third step 510, the algorithm 500 calculates an initial boom angular velocity (e.g., the rate of change of the first angle A1), an initial arm angular velocity (e.g., the rate of change of the second angle A2), and an initial attachment angular velocity (e.g., the rate of change of the third angle A3) to cause the object 400 to move along the established trajectory (the horizontal centerline 410 of FIG. 5, the vertical centerline 420 of FIG. 6, or the sloped centerline 430 of FIG. 7). In a fourth step 512, the algorithm calculates an initial boom actuator hydraulic flow for the boom actuator 170, an initial arm actuator hydraulic flow for the arm actuator 172, and an initial attachment actuator hydraulic flow for the attachment actuator 174. The respective actuator hydraulic flows are calculated in response to the calculated angular velocities and in response to the dynamic loads on the boom and arm caused by the attached object. In a fifth step 516, the algorithm applies the initial boom actuator hydraulic flow to the boom actuator, applies the initial arm actuator hydraulic flow to the arm actuator, and applies the initial attachment actuator hydraulic flow to the attachment actuator.

After initiating the angular movements of the boom 142, the arm 144, and the attachment 146, the algorithm 500 monitors the positions of the boom, the arm, and the attachment using the sensor system 200 as described above. In a sixth (decision) step 520, the algorithm determines whether the object 400 is at the target location. If the object is at the target location, the algorithm stops the current movement in a seventh step 522.

If the object 400 is not at the target location, the algorithm 500 proceeds from the sixth (decision) step 520 to an eighth step 530 wherein the algorithm determines a difference, if any, between the currently measured location of the object and an expected location of the object. The measured location of the object can be determined by using the sensors 200 to determine the location of the attachment 146 and a known vector distance from the location of the attachment to the location of the object. The expected location of the object is determined by the calculated horizontal and vertical velocities and the time duration from a previous measurement and the current measurement. In a ninth step 532, the algorithm modifies the previously calculated horizontal and vertical velocities based on the determined difference. The determined difference can have a horizontal difference component or a vertical difference component or both a horizontal distance component and a vertical distance component.

After modifying one or both of the horizontal and vertical velocities, if needed, the algorithm 500 proceeds to a tenth step 540 and calculates modified boom, arm, and attachment angular velocities based on the modified horizontal and vertical velocities. The algorithm then proceeds to an eleventh step 542 and calculates modified hydraulic flows for each of the boom actuator 170, the arm actuator 172, and the attachment actuator 174. The algorithm then proceeds to a twelfth step 544 and applies the modified hydraulic flows to the three actuators.

After applying the modified hydraulic flows to the three actuators 170, 172, 174, the algorithm 500 returns to the sixth (decision) step 520 where the algorithm 500 again determines whether the object 400 has reached the target location. The algorithm continues to loop in the eighth step 530, the ninth step 532, the tenth step 540, the eleventh step 542, and the twelfth step 544, and back to the sixth (decision) step 520 until the object reaches the target location.

As discussed above, the algorithm 500 also implements the control of the brush unit 450 along the horizontal centerline 460 as illustrated in FIG. 8. The references to the attachment angle A3 in the foregoing description of the algorithm can be replaced with references to the attachment angle A4.

In a further embodiment (not illustrated), the attachment 146 can be replaced with a jackhammer (not shown) or other tool. The jackhammer can be manipulated to move the tip of the jackhammer along a horizontal trajectory as in FIG. 5, along a vertical trajectory as in FIG. 6, or along a sloped trajectory as in FIG. 7. The algorithm 500 enables the operator of the work machine 120 to move the jackhammer to a specific area and activate the jackhammer to break concrete, rock, or other material. With the aid of the algorithm, the operator can move the jackhammer away from the area to allow examination of the area, and then return the jackhammer accurately to the same area for further demolition.

The algorithm 500 can be further modified to accommodate limits to the pivotal movements of the boom 142, the arm 144, and the attachment 146. For example, as illustrated by the object 400 at the location PF in FIG. 6, the boom is at or close to the clockwise limit of rotation. If further vertical movement above the location PF is desired, the algorithm is configured to allow the arm to continue to rotate clockwise and to allow the attachment to continue to rotate counterclockwise without further rotation of the boom such that the object continues to move upward. Initially, movement along the centerline is maintainable by coordinating the rotations of the arm and the attachment until the attachment reaches a rotational limit. When the attachment reaches the rotational limit, the arm can continue to rotate while imposing a slight arcuate movement of the object.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method of controlling the motion of a boom, an arm, and an attachment of a work machine to achieve linear motion of a point-of-interest (POI) of the attachment, the boom pivotally attached to the work machine at a first pivot location, the arm pivotally attached to the boom at a second pivot location, the attachment pivotally attached to the arm at a third pivot location, the boom pivoting about the first pivot location with a boom angular velocity in response to an action of at least one boom actuator, the arm pivoting about the second pivot location with an arm angular velocity in response to an action of at least one arm actuator, the attachment pivoting around the third pivot location with an attachment angular velocity in response to an action of at least one attachment actuator, the method comprising:

establishing a linear trajectory for the POI from an initial POI location to a target POI location;

determining a calculated horizontal velocity and a calculated vertical velocity of the POI with respect to a gravitational coordinate system to cause the POI to have a resulting vector movement along the linear trajectory;

calculating a boom angular velocity, an arm angular velocity, and an attachment angular velocity, the boom angular velocity, the arm angular velocity, and the attachment angular velocity combining to cause the POI to have the calculated horizontal velocity and the calculated vertical velocity;

calculating a boom actuator hydraulic flow to cause the boom angular velocity, calculating an arm actuator hydraulic flow to cause the arm angular velocity, and calculating an attachment actuator hydraulic flow to cause the attachment angular velocity;

applying the boom actuator hydraulic flow to the boom actuator, applying the arm actuator hydraulic flow to the arm actuator, and applying the attachment actuator hydraulic flow to the attachment actuator; and until the POI reaches the target POI location, the method further comprising:

determining a measured location of the POI and comparing the measured location of the POI to an expected location of the POI to determine a POI location difference;

modifying the calculated horizontal velocity and the calculated vertical velocity in response to the POI location difference to generate a modified calculated horizontal velocity and a modified calculated vertical velocity; and calculating a modified boom angular velocity, a modified arm angular velocity, and a modified attachment angular velocity to cause the POI to have the modified calculated horizontal velocity and the modified calculated vertical velocity;

calculating a modified boom actuator hydraulic flow, a modified arm actuator hydraulic flow, and a modified attachment actuator hydraulic flow to produce the modified boom angular velocity, the modified arm angular velocity, and the modified attachment angular velocity; and applying the modified boom hydraulic actuator flow to the boom actuator, applying the modified arm actuator hydraulic flow to the arm actuator, and applying the modified attachment actuator hydraulic flow to the attachment actuator to move the POI toward the POI target location.

2. The method as defined in claim 1 wherein the linear trajectory is generally horizontal with respect to the gravitational coordinate system, and the calculated vertical velocity with respect to the gravitational coordinate system is zero.

3. The method as defined in claim 1 wherein the linear trajectory is generally vertical with respect to the gravitational coordinate system, and the calculated horizontal velocity with respect to the gravitational coordinate system is zero.

4. The method as defined in claim 1 wherein the linear trajectory is sloped with respect to the gravitational coordinate system, and wherein the calculated horizontal velocity and the calculated vertical velocity with respect to the gravitational coordinate system both have respective non-zero magnitudes.

5. The method as defined in claim 1 further comprising an object attached to the attachment.

6. The method as defined in claim 5 wherein the object is a load to be moved from a first location to a second location via the linear trajectory.

7. The method as defined in claim 6 wherein the attachment is an excavator bucket.

8. The method as defined in claim 1 wherein the attachment is a sweeper.

9. The method as defined in claim 1 wherein the attachment is a ground penetration scanner.

10. The method as defined in claim 1 wherein the attachment is a jackhammer.

11. The method as defined in claim 1 wherein the calculated horizontal velocity of the POI is responsive to a horizontal velocity command from an operator of the work machine to cause horizontal movement of the POI.

12. The method as defined in claim 1 wherein the calculated vertical velocity of the POI is responsive to a vertical velocity command from an operator of the work machine to cause vertical movement of the POI.

13. The method as defined in claim 12 wherein the vertical movement includes a first linear portion and a second arcuate portion.

14. The method as defined in claim 1 wherein the calculated horizontal velocity of the POI is responsive to a horizontal velocity command from an operator of the work machine, and the calculated vertical velocity is responsive to a vertical velocity command from the operator of the work machine, the calculated horizontal velocity and the calculated vertical velocity causing inclined movement of the POI.

15. A controller that controls the respective actuators of a boom, an arm, and an attachment of a work machine to cause the boom, the arm, and the attachment to have respective selected angular velocities about respective pivot locations, the controller configured to:

receive an initial location and a target location for a point-of-interest (POI) of the attachment of the work machine establish a linear trajectory for the POI from the initial location to the target location;

determine a calculated horizontal velocity and a calculated vertical velocity of the POI with respect to a gravitational coordinate system to cause the POI to have a resulting vector movement along the linear trajectory;

calculate a boom angular velocity, an arm angular velocity, and an attachment angular velocity, the arm, boom, and attachment angular velocities combining to cause the POI to have the calculated horizontal velocity and the calculated vertical velocity;

calculate a boom actuator hydraulic flow to cause the boom angular velocity, calculate an arm actuator hydraulic flow to cause the arm angular velocity, and calculate an attachment actuator hydraulic flow to cause the attachment angular velocity;

issue hydraulic flow commands to apply the boom actuator hydraulic flow to the boom actuator, apply the arm actuator hydraulic flow to the arm actuator, and apply the attachment actuator hydraulic flow to the attachment actuator;

until the POI reaches the target location:

determine a measured location of the POI and compare the measured location of the POI to an expected location of the POI to determine a POI location difference;

modify the calculated horizontal velocity and the calculated vertical velocity in response to the POI location difference to generate a modified calculated horizontal velocity and a modified calculated vertical velocity;

calculate a modified boom angular velocity, a modified arm angular velocity, and a modified attachment angular velocity to cause the POI to have the modified calculated horizontal velocity and the modified calculated vertical velocity;

calculate a modified boom actuator hydraulic flow, a modified arm actuator hydraulic flow, and a modified attachment actuator hydraulic flow to produce the modified boom angular velocity, the modified arm angular velocity, and the modified attachment angular velocities; and issue hydraulic flow commands to apply the modified boom actuator hydraulic flow to the boom actuator, apply the modified arm actuator hydraulic flow to the arm actuator, and apply the modified attachment actuator hydraulic flow to the attachment actuator to move the POI toward the POI target location.

16. The controller as defined in claim 15 wherein the linear trajectory is generally horizontal with respect to the gravitational coordinate system, and the calculated vertical velocity with respect to the gravitational coordinate system is zero to cause horizontal motion of the POI.

17. The controller as defined in claim 15 wherein the linear trajectory is generally vertical with respect to the gravitational coordinate system, and the calculated horizontal velocity with respect to the gravitational coordinate system is zero to cause vertical movement of the POI.

18. The method as defined in claim 17 wherein the vertical movement includes a first linear portion and a second arcuate portion.

19. The controller as defined in claim 15 wherein the linear trajectory is sloped with respect to the gravitational coordinate system, and wherein the calculated horizontal velocity and the calculated vertical velocity with respect to the gravitational coordinate system both have respective non-zero magnitudes to cause inclined movement of the POI.

* * * * *